US006899152B2

(12) United States Patent
Godfrey (10) Patent No.: US 6,899,152 B2
(45) Date of Patent: May 31, 2005

(54) DOVETAIL JIG

(76) Inventor: Christopher Martin Valentine Godfrey, The Old School, Godney, Wells, Somerset (GB), BA5 1RY ( * ) Notice: Subject to any disclaimer, the term of this patent is extended or adjusted under 35 U.S.C. 154(b) by 0 days.

(21) Appl. No.: 10/097,435

(22) Filed: Mar. 13, 2002

(65) Prior Publication Data

US 2003/0172993 A1 Sep. 18, 2003

(51) Int. Cl.$^7$ .................................................. B27C 5/00
(52) U.S. Cl. ............................... 144/144.51; 144/145.1
(58) Field of Search .................................. 144/137, 142, 144/143, 144.1, 144.51, 144.52, 135.2, 136.1, 85–90, 372; 409/125, 130, 79

(56) References Cited

U.S. PATENT DOCUMENTS

| 4,428,408 A | * | 1/1984 | Grisley | .................... 144/371 X |
| 4,995,435 A | * | 2/1991 | Godfrey | ................. 144/144.52 |
| 5,090,283 A | | 2/1992 | Noble | |

FOREIGN PATENT DOCUMENTS

| GB | 2080728 | * 2/1982 | ................... 144/89 |
| GB | 2204828 | 11/1988 | |

* cited by examiner

*Primary Examiner*—Allen Ostrager
*Assistant Examiner*—Shelley Self
(74) *Attorney, Agent, or Firm*—MacMillan, Sobanski & Todd, LLC (57) ABSTRACT

A set of plates that interact to control the action of a router to direct it to shape interlocking components in sheet materials. The device is mainly applicable to dovetail joints but it can be applied to lettering and decoration. One of the plates supports the router over the workpiece. A second plate forms a shaped base for the router. Two further plates control the movement of the router plate and hence the router itself on the base plate. Another of the set of plates is indented with depressions that act as a template that controls the position of the cut of the router by means of an attached locating pin that can follow the template. The positioning of the router and the way it attacks the sheet material is unrestrained until checked by the plates. These plates together can form a set of dovetail jigs that cut both through and lapped dovetails using any dovetail cutter.

15 Claims, 6 Drawing Sheets

DOVETAIL JIG

BACKGROUND OF THE INVENTION

Router jigs that make dovetails for woodwork generally consist of a template having a row of finger-like projections that form the top surface of the jig. A router, used as a cutting means, sits upon the template such that the spinning cutter thereof is guided in and out of the finger-like projections by a guide bush encircling the cutter. The workpiece is fixed below the template to be cut. This system has several advantages. It is easy to understand as a concept, and requires little skill to operate. Unfortunately, it commonly produces very mechanical looking dovetails with the dovetail appearing the same size as the dovetail pin. The template is quite easily damaged by the router through inattention of the operator, and in practice, it is difficult to cut the wood without the cutter causing breakout or tear out of the wood fibers.

Two basic types of dovetail joint can be made with jigs. The first type is referred to as a through dovetail, which is often used for jointing boards to form chests and boxes. Both the tail and the dovetail pin show end-grain. For through dovetails, the two pieces are cut one after the other, with both components being held in the device vertically. The first piece is cut with a dovetail cutter to make the dovetail sockets. The second piece is shaped with a straight cutter moving at angles to make wedge shaped pins to fit into the sockets. The angle of the pin is determined by the angle of the template's fingers which is made to match the angle of the cutter that cuts the socket. The second type is referred to as a half-blind or lapped dovetails, which is commonly used for drawer fronts where the joint is visible from the side, but no end-grain shows on the front of the drawer. For lapped dovetails, the two pieces to be joined are mounted with one piece vertical and the other horizontal. The cutter cuts through the vertical piece making tail sockets and goes a set distance into the other horizontal piece making the pin pockets. The spacing of the cuts and the forward travel of the cut into the second horizontal piece are controlled by the length and spacing of the fingers of the template. The depth of the cut vertically is determined by the depth of the router. Both the tail and the pin are made by the same dovetail cutter at the same time. Simple jigs are so designed that the socket made by the cutter and the wood left between sockets are equal. By this means, the wooden dovetail shape between two sockets of one piece is fitted into the socket of the other and vice versa. Each template is matched to a particular cutter size. Fine adjustment of the fit is obtained by fractionally raising or lowering the cutter.

Mostly, these two different joints are made on different jigs. There are types of jigs that combine the two, but the principle of fixing the wood and moving the router in and out of the fingers of a template is common to all types, with one significant exception.

SUMMARY OF THE INVENTION

Figure 1:
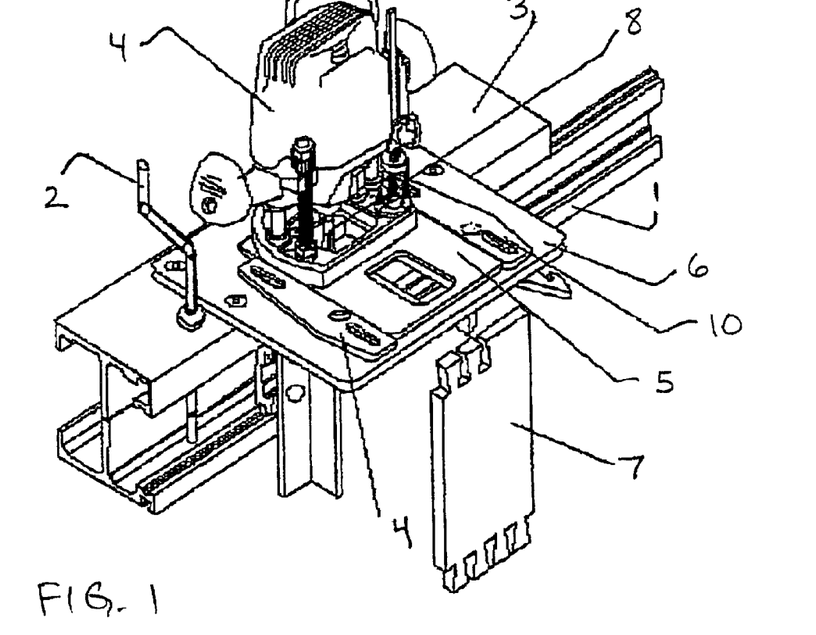
FIG. 1 shows a router and dovetail jig assembly.

The current application is preferably but not exclusively applicable to a different type of woodwork jointing machine which gained an UK Patent in 1989. The disclosures of this UK Patent No GB 2204828 are hereby incorporated by reference. The machine described in GB 2204828 does not use a template, but instead configures a set of sliding plates on a supporting plate which can be controlled to run at any angle across the workpiece, so that the cutter can cut any angle of dovetail pin. This system is so flexible that it can fit dovetail pins to any size or shape of dovetail bit. The present application preferably but not exclusively uses this latter type of jointing machine (FIG. 1). With it, the router's axis is fixed so that the cutter moves forwards and backwards and the wood moves left and right. The device presents the wood at successive joint positions where the router's cutter cuts the joint. The wood, firmly held on a sliding carrier 1, is tracked left and right by a handle and cable mechanism 2, along the carriage 3. The cutting means—usually a router 4—fixed to a router plate 5, moves forwards and backwards across the axis of the wood. The router plate in turn sits on a base plate 6, that forms a ceiling to the workpiece tracking beneath it. The cutter protrudes through openings in both plates to cut the workpiece below. Dovetails can be made on this machine. When cutting dovetail pins, the guiding of the cut is done: a) by a pivoting plate moveably fixed to the base plate, around which the router can swivel and also move forwards and back, either perpendicular to the plane of the work, or at angles. The cutter is unrestrained and free to cut the work until the front of the plate is checked in its lateral movement by; b) spiral shaped stops, that can be fixed to limit the angle the plate can travel at. The router on its plate will then travel at a definite angle that can be subtly altered by turning and re-fixing the spiral shaped stops. The spiral stops are placed to limit the angle of travel of the router's plate and hence determine the position of the cuts as the operator slides the router against them, cutting the right and left-hand edges of the dovetail pin. Because the pivot point can be placed anywhere in front of the router, and because the position of the spiral stops can be infinitely varied, any size of dovetail pin can be exactly made. This flexibility, although evidently useful, means that it is not the easiest of jigs to comprehend or for the unskilled operator to use. As a simpler alternative, the present application works without the central plate and its pivot point. The angles of the dovetail cutters are standardized and the geometry of the plates designed to work just with that angle. This, in conjunction with those matching cutters, reduces the number of different options available and adds simple readily understandable jigs to a machine which is otherwise seen as complex.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
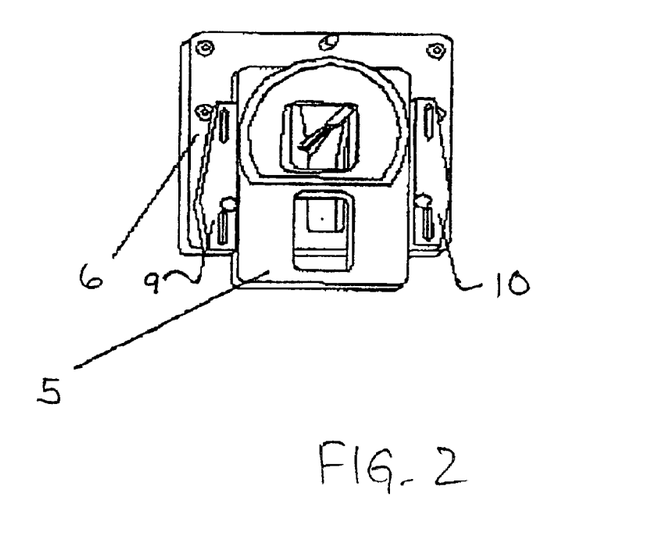
FIG. 2 is a plan view of the plates of the jig of FIG. 1.

FIG. 1 shows the machining means as a router, supported on its supporting plates, with the workpiece taken out of its sliding carriage to show a number of dovetail sockets that have been cut by the dovetail router bit. FIG. 2 is a plan view of the plates and the base of the router. The guides are fixed with the straight sides inward, to guide the router support plate square to the work. The workpiece is clamped onto a sliding carriage 1 and tracked laterally using the handle 2. The carriage of the device and the cutting means work as described above. The workpiece 7 is tracked left and right to place the joint position under the cutting means. The essential difference is in the plates that direct the way that the cutter comes forward through the workpiece. The base plate 6 carries the cutter means, preferably a router 4, as before, but there is no central pivot mechanism to direct the router. The router on its plate 5, is free to move over the base plate. Its lateral travel is limited by guide plates 9 and 10, fixed on either side of it.

Making Dovetail Sockets

Sockets are made by pulling a dovetail cutter forward through the workpiece perpendicular to the face. The work is tracked laterally to the next joint position, and the second cut is made. Each guide 9 and 10, is shaped with one side straight, whereas the other side has two angled edges. These angles are equal to the dovetail angle. When making dovetail sockets, the straight sides of the guide are placed inwards towards the support plate of the router, so that the router can move and cut forwards and backwards, square across the workpiece. The wood is tracked to each position and the cut is made. Using a dovetail shaped bit 11, this makes the dovetail sockets at each predetermined position. FIG. 1 shows the workpiece with one end finished and the other with the first three sockets cut. FIG. 2, is a plan view showing the guide plates presenting their straight edges to control the straight cut of the dovetail bit.

Making the Pin

When all the sockets are cut, the second corresponding workpiece 11, is presented to the cutter at each joint position in turn. The cutter is changed for a straight cutter 12, but the guide plates 9 and 10, are interchanged left for right and vice versa. The guides are simply demountable by a common workshop tool such as an Allen key. Alternatively, they could be fixed with some quick release snap-in fixing. This presents the angled edges to the router plate 4. The router is now able to travel freely between the angled plates. Its sideways travel is limited by the angled inside edges of the plates. The main edge of the router plate runs along the further part of the edge of the guide, say on the right, while the front part of the left hand edge runs along the front part of the left hand guide. This forms a notional track for the router to run forward and back on, at the same angle as the dovetail angle. The pivot point is notional rather than an actual pivot mechanism. The router is simply kept in place by pressure of the hand. Preferably the router's plate is rebated to interact with the lipped edge of the guide plates, so that it cannot lift out of its course.

Figure 3:
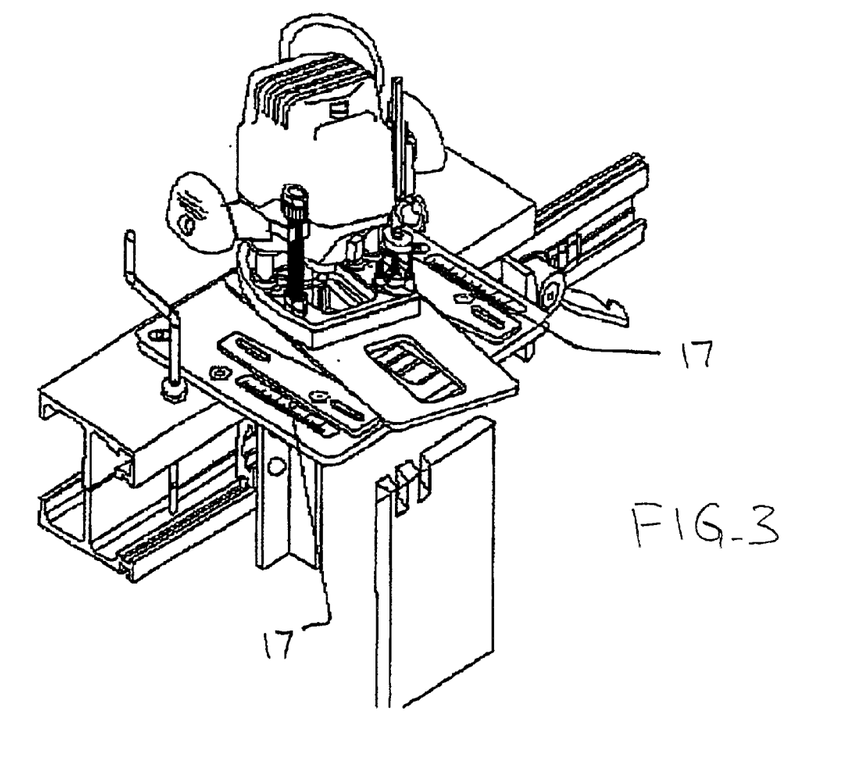
FIG. 3 illustrates the set up of the jig to form angle cuts in a workpiece.

FIG. 3 shows the first two right-hand angled cuts being made for the first and second pin positions.

Figure 4:
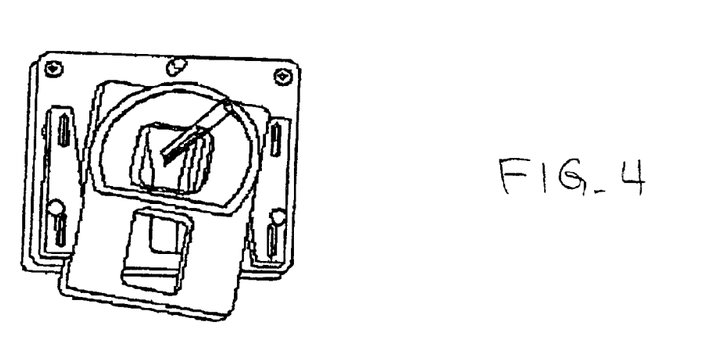
FIG. 4 is a plan view of the jig plates of FIG. 3.

FIG. 4 shows a plan view of the right-hand cut. The angle of the track is the same as the dovetail angle. So a straight cutter will make a wedge shaped pin by cutting through the work first on the right hand angled track, forward and back. Then, with the cutter pushed well behind the work, the router can be moved over to the left. The plate engages with the guide plates in a way as before, but handed and the router is brought forward to cut the wood. These two cuts are made as it were on the two branches of a V. Between the two cuts is formed the pin.

Figure 5:
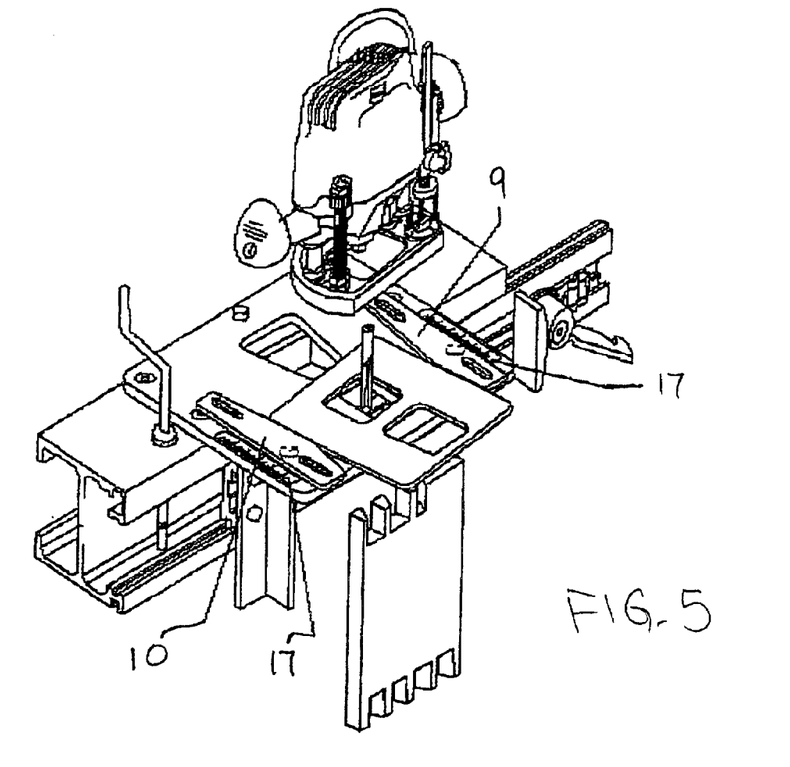
FIG. 5 illustrates the set up of the jig to form a left-hand tracking cut.

FIG. 5 shows the left-hand tracking cut to make the pin. The bottom pins are all done and the first three pins of the other (top) end are complete.

Figure 6:
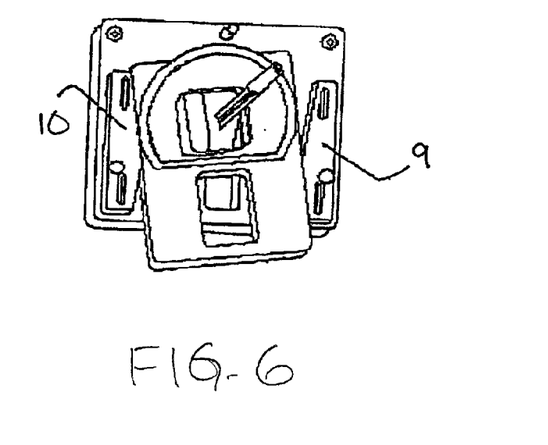
FIG. 6 is a plane view of the jig plates of FIG. 5.

FIG. 6 shows this tracking cut in plan.

Figure 7:
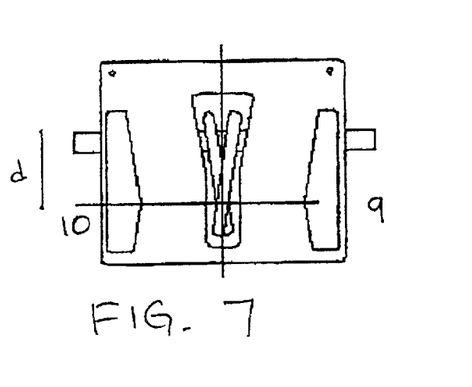
FIG. 7 is a diagrammatic representation of left and right cuts converging to form a V-shape cut in the workpiece.

FIG. 7 is a diagram of the cuts on the right and on the left with the tracks going forward to form a V-shape with the notional pivot point at the point of the V. The distance between the point 15, and the back of the workpiece 16, is d.

Figure 8:
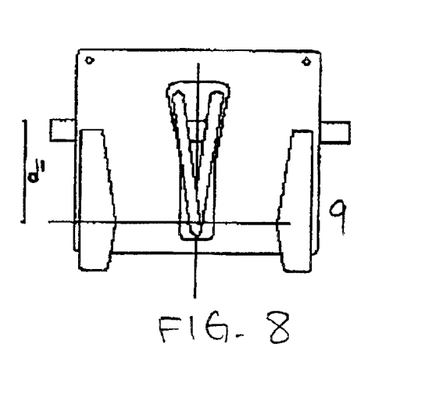
FIG. 8 is an exploded view of the set-up for making lapped dovetails.

FIG. 8 is an exploded view of the set-up for making lapped dovetails. In this set-up the guide plates are brought forward on the base plate. This has brought the notional pivot point forward so that the distance between the pivot and the back of the workpiece is $d^1$. It can be seen that the dovetail pin formed between the two tracks of the cutter is now larger. The size of the pin is determined by the distance of the notional pivot point (the point of the V) 15, from the back face of the workpiece 16. If the two guides are set close to the work the pin will be small. If the guides are brought forward and therefore set further away from the work, the pin will be larger. The exact position of the guides is given on a scale placed on the base plate 17. Both guides must be fixed at the same distance. This distance can be calculated, being a factor of the diameter of the two bits, that is the dovetail bit and the straight bit that cut the pin, and the angle of the cuts.

The advantage of this way of jigging up the dovetail pin is that any size of cutter can be accommodated and dovetails made with it (provided that it is of the same angle as the guides). The required positions can preferably be read off a chart for each pair of cutters and the fixing position can be aligned with scales fixed to the base plate. Fine tuning can be accomplished by simply moving the guide plates a degree or two forward or back.

Making Lapped Dovetails

Figure 9:
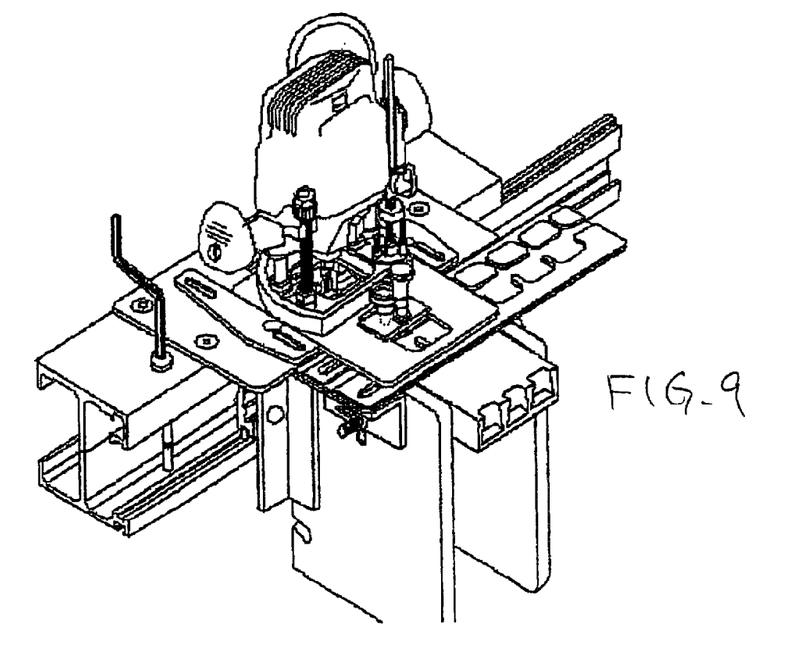
FIG. 9 illustrates the set up of the jig to form a lapped dovetail.

FIG. 9 shows the set up for the jig for lapped dovetails.

Figure 10:
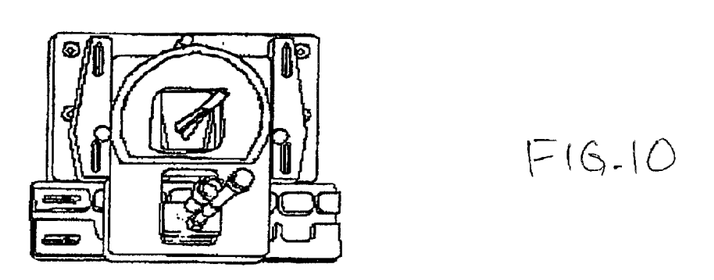
FIG. 10 is a plan view of the jig plates of FIG. 9.

FIG. 10 is a plan view of the set-up of the plates. The locating plunger is tracking its path in the indentations of the template.

Figure 11:
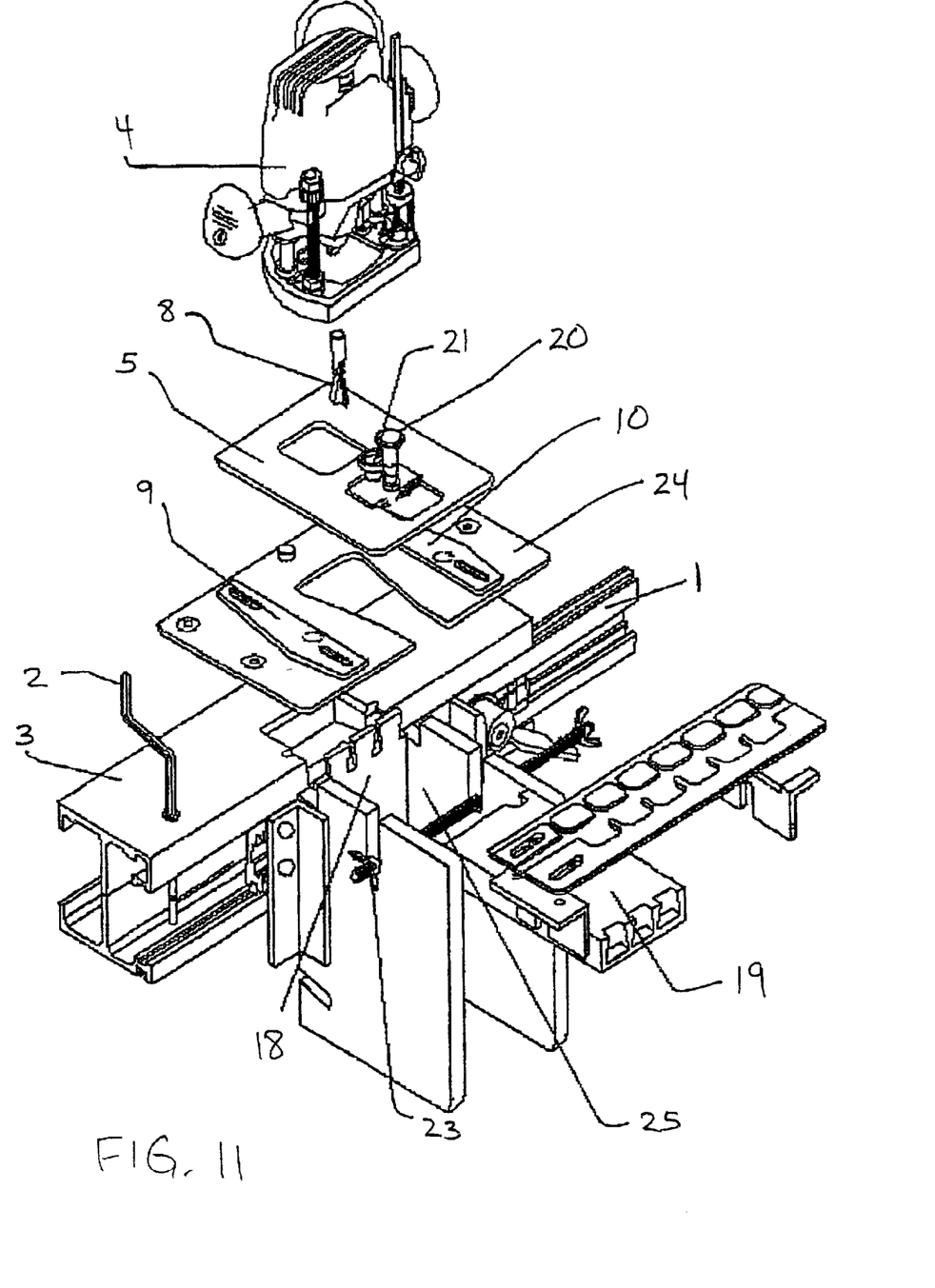
FIG. 11 is an exploded view of the dovetail jig assembly.

FIG. 11 is an exploded view of the parts of the jig and the supporting carrier for the workpiece. Lapped Dovetails can be made using most of the same components. The apparatus employs the same way of holding the router by its edges and the router plate 5 and the same guide plates 9 and 10, can be used. A dovetail bit is used for both tails and pins. Again, there is no guide-bush or bearing running against the fingers of a template. There is a template 22, but it works differently. When cutting lapped dovetails the two workpieces are cut together as conventionally; the one vertical 18, (for example a drawer side) and the other horizontal 19, (the corresponding drawer front). In order to avoid the mechanical look of the type of dovetail where the tail and the pin are the same size, a different mechanism for determining the path of the router through the wood is used, as set out below:

The router plate is furnished with a form of indexing plunger preferably of the type with a rest position 20. It can move forwards and backwards on the router's plate and can be fixed to the plate with a holding down screw 21. The locating pin of the plunger can be dropped into shallow depressions cut into an accurately manufactured template 22, made from sheet material. The template is secured to the horizontal carriage that holds the horizontal and the vertical workpieces with a holding mechanism 23, so that they all track left and right together. In order to accommodate the template, the base plate of this jig is cut back and the opening for the cutter left open in design 24. The plate supports the router and its plate as before, but the router plate 5, and the locating plunger 20, over-ride the template 22, so that the plunger can interact with the template. The forward and backward movement of the router is contained laterally by the guide plates 10 and 9, and the router moved by hand. The lateral movement of the workpiece and the fore and aft movement of the router is free until stopped by the locating pin, running in the grooves in the template, coming up against the template's walls. The track of the pin in the template therefore determines the path of the cutter cutting into either of the two workpieces, since the pin and the cutter are both fixed to the support plate of the cutter means 4. By the pin following the grooves, the cutter will preferably first cut the tail sockets in the vertical piece. This might commonly be a drawer side. The drawing shows a gap 24, between the side (vertical) piece 17 and what might be the drawer front (horizontal) piece 18. This allows the cutter to continue forward through the side piece and to move a distance horizontally before coming forwards to cut the pockets for the tails in the end of the drawer front. By this means it will not spoil the exposed face of the drawer side. The two workpieces do not have to be offset as with a conventional jig and so the tails and pins do not have to be the same size in a way that makes the results of the common dovetail jig look mechanical. Indeed, the pin pockets can be cut at any spacing or depth and the tails can be cut to fit exactly with the pin pockets, in a quick and simple fashion. Importantly, there will be no mismatch between the two workpieces which would otherwise result in a 'winding' of the drawer when assembled.

The templates 22, can be manufactured with a wide variety of different spacings and to suit any preferred size of cutter, while these complex joints can be made by simply following the template. This way, dovetailed drawers visually equivalent to the best hand-made work can be made as accurately and with as little skill as with any conventional dovetail jig.

The forgoing description is for a dovetail jig allied to a carriage whereby the wood is tracked left and right and the cutting means moves along a fixed axis. A different carriage arrangement can employ a means of fixing the workpiece, and securing to it a sliding mechanism whereby the cutting means and the jig itself can track from one joint position to the next, and work in exactly the way described to cut the joints in the workpiece.

Figure 12:
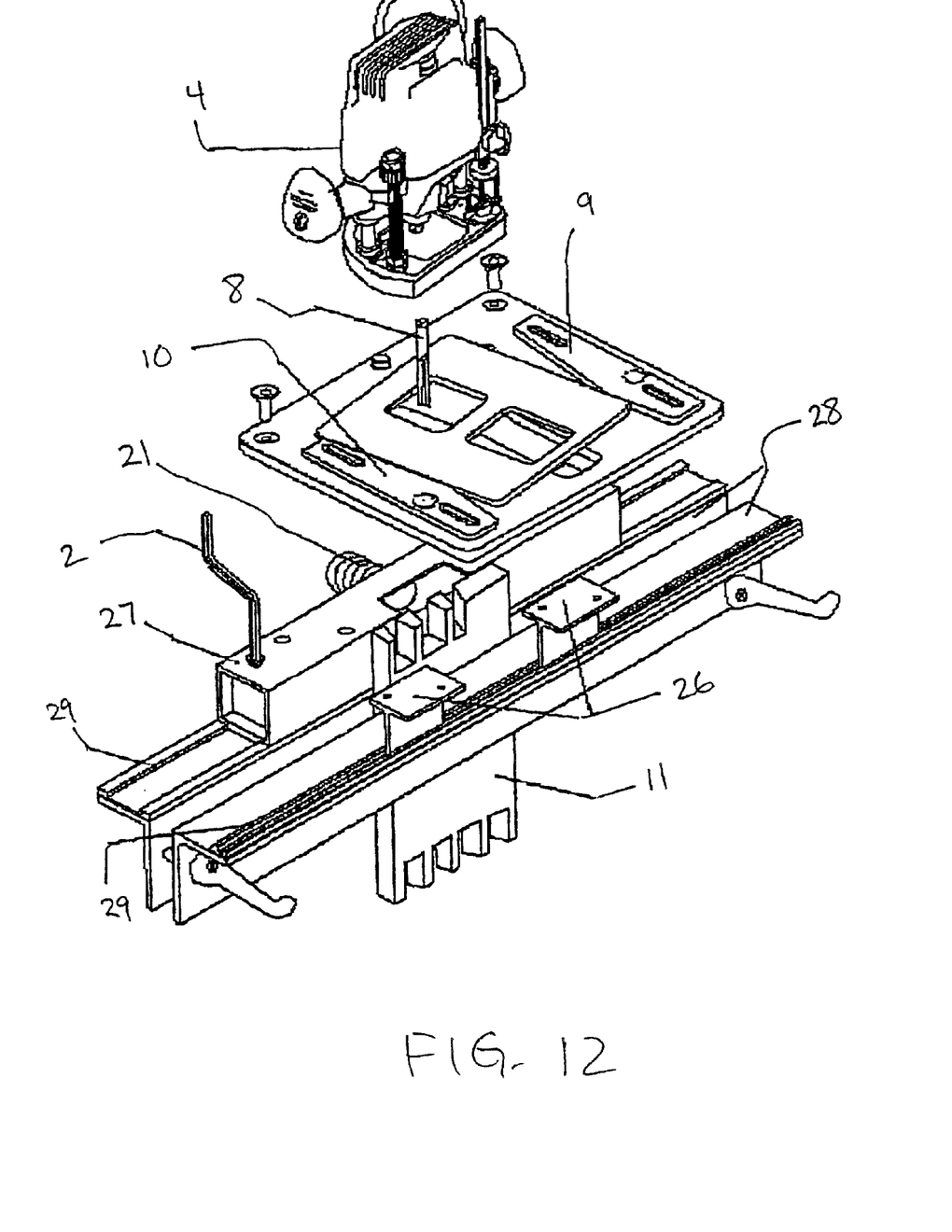
FIG. 12 shows an alternative configuration of the supporting mechanism for the plate mechanism.

FIG. 12 shows such an arrangement. A clamping device which might be made of two profiled bars 26, can tighten up on the work piece 1. The top surface of the clamping device supports sliding tracks 29 and 30 that receive the sliding surfaces of a carriage 27 and 28. That carriage in turn supports the cutting means, with its supporting plates and the guides 4, 5 and 6, 9 and 10.

FIG. 12: This shows an alternative configuration of the supporting mechanism for the plate system, whereby the machining means tracks across the workpiece.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for machining a workpiece comprising:
   a carriage;
   a carrier supported on said carriage for sliding movement relative thereto, said carrier adapted to support a workpiece;
   a base plate secured to said carriage;
   a pair of guide plates supported on said base plate and defining a gap therebetween, each of said guide plates being demountable from and adjustably positionable relative to said base plate to define alternative configurations for said gap;
   a plate supported on said base plate in said gap, said plate engaging either or both of said pair of guide plates for limited sliding movement relative thereto; and
   a cutting means supported on and movable with said plate, said cutting means adapted to engage and machine the workpiece.

2. An apparatus according to claim 1 wherein each of said pair of guide plates includes, in its longitudinal direction, a first edge having first and second straight portions that form an angle between them.

3. An apparatus according to claim 2 wherein each of said pair of guide plates includes, in its longitudinal direction, a second straight edge.

4. An apparatus according to claim 1 wherein said pair of guide plates is made of separate moveable pieces such that respective edges of said pair of guide plates can be altered and re-fixed so as to re-define said gap.

5. An apparatus according to claim 1 wherein said pair of guide plates are moveable, but can be fixed relative to said base plate in at least one of alternative positions and orientations, allowing free movement of said cutting means within a defined machining zone.

6. An apparatus as claimed in claim 5 wherein said machining zone of said cutting means is bounded by said guides which are shaped to provide edges to said cutting means at predetermined angles which correspond to the angles of at least one of a mating component, a required aesthetic effect, a functional effect, and any combination thereof.

7. An apparatus according to claim 1 wherein said plate is adapted to be mounted over a workpiece, and wherein means are provided to move the workpiece underneath said plate into predetermined positions such that a portion of the cutting means extends through said plate to machine the workpiece.

8. An apparatus according to claim 7 wherein said pair of guide plates are movably fixed on either side of said plate to guide movement of said plate and said cutting means, each of said pair of guide plates presenting an edge to said plate having two distinct and equal angled surfaces such that said plate can either move freely between said guide plates or can be angled to rest against part of one of said pair of guide plates and part of the other of said pair of guide plates, said pair of guide plates thus forming a notional bounded machining zone along which an operator can slide said cutting means.

9. An apparatus as claimed in claim 8 wherein sides of said plate that engage said pair of guide plates are straight and parallel.

10. An apparatus as claimed in claim 9 wherein said cutting means is provided with a straight cutter that can form a dovetail pin on a workpiece.

11. An apparatus according to claim 7 wherein said plate is movable with respect to a fixed workpiece.

12. An apparatus according to claim 1 wherein each of said pair of guide plates defines a respective machining axis and can be angled with respect to one another such that a point of intersection of said respective machining axes can be adjusted relative to a workpiece.

13. An apparatus according to claim 1 further including a locating pin associated with said plate supporting said cutting means, said pin being capable of interacting with indentations and channels in a template that can be fixed to a workpiece so that said template controls the movement of said locating pin and, therefore, controls movement of said cutting means.

14. An apparatus according to claim 13 wherein said template is shaped to allow said cutting means to cut both pins and tail pockets of half-lapped dovetails at the same time.

15. An apparatus according to claim 1 wherein said cutting means is capable of machining at least one of dovetail sockets, dovetail pins, lettering, and free shapes.

* * * * *